(12) United States Patent
Hoffman (10) Patent No.: US 11,370,558 B2
(45) Date of Patent: Jun. 28, 2022

(54) AIRFIELD TIE-DOWN WITH DEPLOYABLE TALONS

(71) Applicant: United States of America as Represented by The Secretary of The Army, Alexandria, VA (US)

(72) Inventor: Nolan R Hoffman, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 16/742,841

(22) Filed: Jan. 14, 2020

(65) Prior Publication Data

US 2021/0214101 A1    Jul. 15, 2021

(51) Int. Cl.
*B64F 1/16* (2006.01)
(52) U.S. Cl.
CPC .................................... *B64F 1/16* (2013.01)
(58) Field of Classification Search
CPC .... B64F 1/12; B64F 1/125; B64F 1/16; E04G 15/04
See application file for complete search history.

(56) References Cited

U.S. PATENT DOCUMENTS

| 2,243,886 A * | 6/1941 | Scott | B64F 1/16 52/160 |
| 3,298,148 A * | 1/1967 | Dickson | B64F 1/16 52/309.7 |
| 10,232,200 B2 * | 3/2019 | Salm | E04G 21/3276 |
| 2015/0217871 A1 * | 8/2015 | Mardini | B64F 1/125 244/116 |

* cited by examiner

*Primary Examiner* — Richard G Davis
(74) *Attorney, Agent, or Firm* — Brian C. Jones (57) ABSTRACT

In one embodiment, tie-down assembly is provided for securing a parked aircraft to a slab of an aircraft mooring area. The assembly includes a support structure having a first side wall, a second side wall, a first end cover coupled with the first side wall and the second side wall, and a second end cover coupled with the first side wall and the second side wall. The assembly also includes a connector rod coupled with the first side wall and the second side wall, a talon pivot rod coupled with the first side wall and the second side wall, a first talon rotatably coupled with the talon pivot rod, a second talon rotatably coupled with the talon pivot rod, a first depth adjustment mechanism coupled with the first talon, and a second depth adjustment mechanism coupled with the second talon.

20 Claims, 6 Drawing Sheets

AIRFIELD TIE-DOWN WITH DEPLOYABLE TALONS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to anchoring techniques, and, more particularly but not exclusively, to tie-down devices and methods that can be used to secure a parked aircraft against movement.

DESCRIPTION OF THE RELATED ART

This section introduces aspects that may help facilitate a better understanding of the invention. Accordingly, the statements of this section are to be read in this light and are not to be understood as admissions about what is prior art or what is not prior art.

Tie-down systems are well known in the aircraft industry. Airports and other aircraft utility areas are equipped with tie-downs, which may also be referred to as moorings. Tie-down devices are used to tether parked aircraft to the ground or otherwise restrain the aircraft against unwanted movement. Commonly used tie-down devices include metal anchors, such as U-bolts, or Ω-shaped rods, that are positioned within a recess in the surface of the aircraft parking area. The aircraft is secured to the tie-down device by a mooring line. Typically, the mooring line is coupled with the aircraft at one end, and with the recessed anchor of the tie-down device at the other end. A single aircraft can be tethered to multiple tie-down devices positioned about the aircraft.

Existing tie-down devices are helpful in providing firm anchorage for aircraft when parked at an aircraft mooring area such as a runway, a parking apron, or a ramp. Yet still further improvements in tie-down technology are desired. Embodiments of the present invention provide solutions for at least some of these outstanding needs.

SUMMARY

The present invention was developed to address the challenges associated with existing tie-down devices. For example, tie-down devices as disclosed herein are well suited for use with concrete slabs having a variety of thicknesses. Research and development has led to a novel approach for constructing tie-down devices.

The present invention advances the science of tie-down devices. This disclosure describes a new tie-down assembly intended to replace currently known tie-down devices. Particular focus will be placed on the adjustable nature of the tie-down device and the method in which the tie-down device can be installed at an aircraft parking area. The tie-down devices presented here are shown to be more versatile, adaptable, and effective than prior devices. What is more, the instant tie-down devices are simple in construction, economical to fabricate, and easy to use, particularly in a time-efficient manner.

Existing aircraft tie-down devices may be used in aircraft parking areas where the thickness of the concrete slab or pavement is known and consistent. However, in certain circumstances, such as during wartime, it may not be possible to know in advance the thickness of the concrete slab where the aircraft are parked. In such circumstances, it is advantageous to have a tie-down device that is adjustable, so that it can be used with concrete slabs or pavements having any of a variety of thicknesses. Moreover, it is advantageous to have an adjustable tie-down device that can be quickly installed on whatever type of aircraft mooring area or aviation field parking platform which might exist.

A novel aircraft tie-down device as disclosed herein includes a rectangular body attached with two pivoting talons, and each talon includes a nut and bolt depth adjustment mechanism, whereby the tie-down can be used with concrete slabs or pavements of different thicknesses.

Tie-down assemblies as disclosed herein provide talons that can be braced against the bottom of a parking area slab. In some cases, the tie-down assemblies can provide approximately + or −3 inches of vertical adjustability, so as to accommodate the actual pavement thickness, and/or to bring the top of the tie-down assembly in alignment relative to the slab top surface as desired. In some cases, installation of the tie-down assemblies may require only one 12-inch core to be drilled for a retrofit installation. Tie-down assemblies as disclosed herein can be installed during an initial construction or can be retrofit to existing constructions. Tie-down assemblies as disclosed herein can also provide greater design capacity than other current aircraft loads (e.g. 70+ kips). In contrast, other currently known tie-downs may require a larger area of pavement due to their size and installation method parameters. Other known tie-down designs are not adjustable once on site, nor can they be adjusted from their original design to account for variation in pavement thickness. Still further, other known tie-down designs may require rebar and or dowels to be installed when retrofit to an existing pavement. What is more, other known designs may not brace against the base of the parent slab and therefore have little or no vertical pullout resistance.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a." "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In at least one embodiment, the present invention aims to address the shortcoming of existing tie-down devices by providing a tie-down device that can easily be used with a wide variety of aircraft parking or mooring areas which may have concrete slabs of varying or unknown thicknesses.

Tie-Down Apparatus

Figure 1:
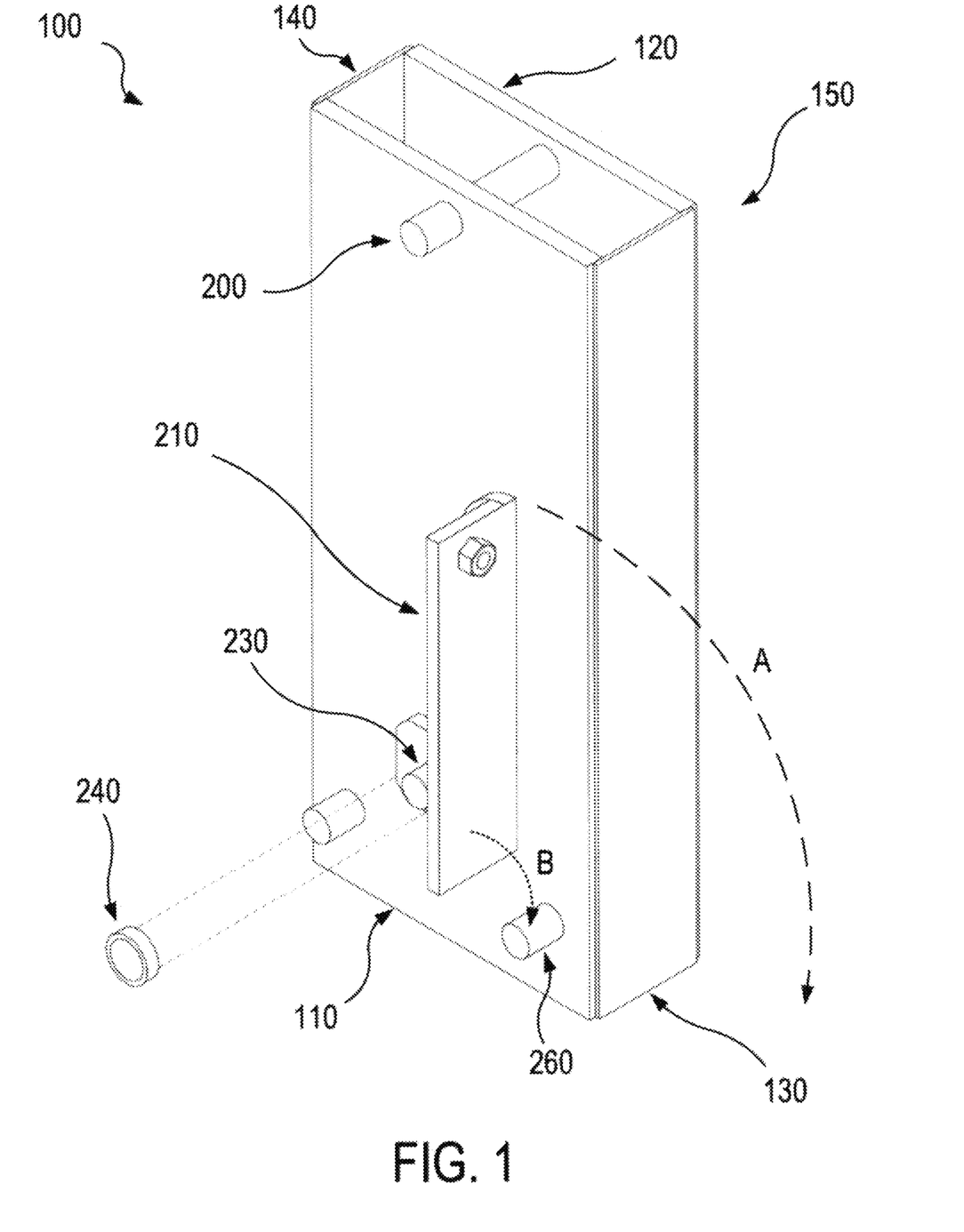
FIG. 1 depicts aspects of a tie-down assembly according to certain embodiments of the invention.

FIG. 1 depicts a perspective view of an aircraft tie-down assembly 100 according to embodiments of the present invention. As shown here, tie-down assembly 100 includes a first side wall 110, and a second side wall 120 opposing the first side wall 110. In some cases, the side walls have a width of 8⅞ inches. Further, the tie-down assembly 100 includes a first end cover 130, and a second end cover 140 opposing the first end cover 130. In some cases, the end walls have a width of 2½ inches. Collectively, the side walls and end covers provide a support structure 150. In some cases, the support structure 150 can be provides as a single-core box. In some cases, the height of the side walls and end covers (or the height of the support structure) can be selected or determined based on the thickness of the slab. In some cases, such heights can be within a range between 8 inches and 12 inches. Tie-down assembly 100 also includes a connector rod 200 extending between and coupled with the first side wall 110 and the second side wall 120. In use, the side walls and/or end coves of the tie-down assembly 100 are configured to permit convenient access to the connector rod 200, so that a mooring hook or tether line may be attached with the connector rod 200, thus securing the aircraft to which the hook or line is connected. The side walls and end covers can be constructed of any desired material, for example stainless steel or some other metal or alloy.

The tie-down assembly 100 also includes a first talon 210 and a second talon (not shown). The first and second talons are in operative association with a talon pivot rod 230. As shown here, a first stop ring 240 can be coupled with the talon pivot rod 230, so as to prevent the first talon 210 from sliding off the talon pivot rod 230. The first talon 210 can rotate or pivot about the talon pivot rod 230 as depicted by arrow A, so as to move from an undeployed configuration (as shown here) to a deployed configuration (as shown elsewhere herein), for example in which the first talon 210 contacts a first talon stop rod 260 as indicated by arrow B.

Figure 2:
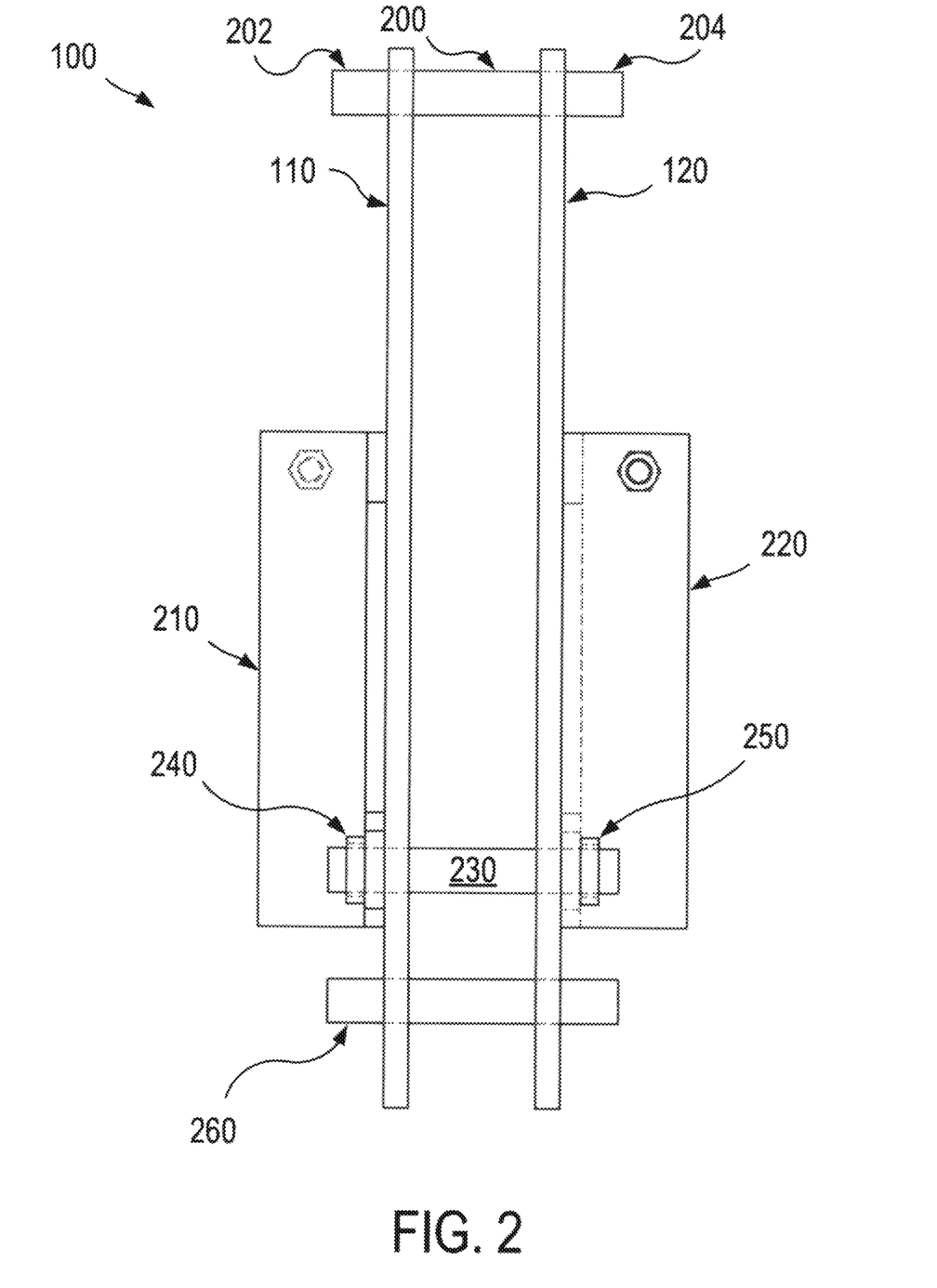
FIG. 2 illustrates aspects of a tie-down assembly according to certain embodiments of the invention.

FIG. 2 depicts an end view of an aircraft tie-down assembly 100 according to embodiments of the present invention. As shown here, tie-down assembly 100 includes a first side wall 110, and a second side wall 120 opposing the first side wall 110. Further, the tie-down assembly 100 includes a first end cover (not shown, and a second end cover (not shown) opposing the first end cover. Tie-down assembly 100 also includes a connector rod 200 extending between and coupled with the first side wall 110 and the second side wall 120. In use, the side walls and/or end coves of the tie-down assembly 100 are configured to permit convenient access to the connector rod 200, so that a mooring hook or tether line may be attached with the connector rod 200, thus securing the aircraft to which the hook or line is connected. In some cases, the connector rod 200 provides a connection point to attach a lifting shackle or hook, which in turn is coupled with a cable that is attached with the aircraft. What is more, the connector rod 200 can be attached to a which holds the tie-down assembly in place during installation, as discussed elsewhere herein.

The tie-down assembly 100 also includes a first talon 210 and a second talon 220. The first and second talons 210, 220 are in operative association with a talon pivot rod 230. As shown here, a first stop ring 240 can be coupled with the talon pivot rod 230, so as to prevent the first talon 210 from sliding off the talon pivot rod 230. The first talon 210 can rotate or pivot about the talon pivot rod 230, so as to move from an undeployed configuration (as shown here) to a deployed configuration (as shown elsewhere herein), for example in which the first talon 210 contacts a first talon stop rod 260. Similarly, a second stop ring 250 can be coupled with the talon pivot rod 230, so as to prevent the second talon 220 from sliding off the talon pivot rod 230. The second talon 220 can rotate or pivot about the talon pivot rod 230, so as to move from an undeployed configuration (as shown here) to a deployed configuration (as shown elsewhere herein), for example in which the second talon 220 contacts a second talon stop rod (not shown).

According to some embodiments, the connector rod 200, pivot rod 230, and/or stop rods can be welded or otherwise attached to the exterior of the side walls. The pivot rod 230 should allow attachment of the talons. The stop rings 240, 250 can be welded to the end of the pivot rod 230 after the talons 210, 220 are placed on the pivot rod 230. The stop rings should not prevent the talons from rotating relative to the side walls.

Figure 3:
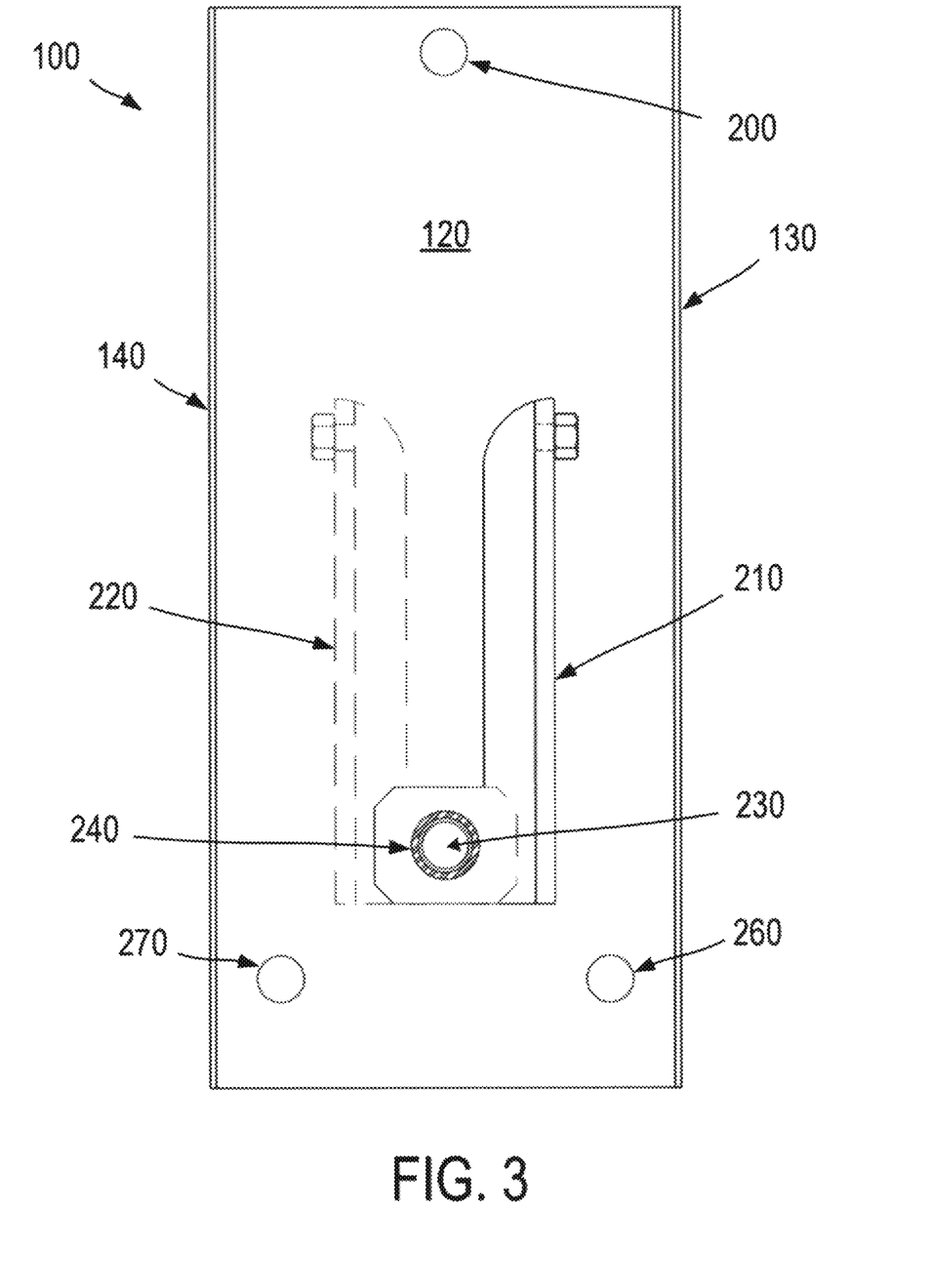
FIG. 3 illustrates aspects of a tie-down assembly according to certain embodiments of the invention.

FIG. 3 depicts aside view of an aircraft tie-down assembly 100 according to embodiments of the present invention. As shown here, tie-down assembly 100 includes a first side wall 110, and a second side wall (not shown) opposing the first side wall 110. Further, the tie-down assembly 100 includes a first end cover 130, and a second end cover 140 opposing the first end cover. Tie-down assembly 100 also includes a connector rod 200 extending between and coupled with the first side wall 110 and the second side wall. In use, the side walls and/or end coves of the tie-down assembly 100 are configured to permit convenient access to the connector rod 200, so that a mooring hook or tether line may be attached with the connector rod 200, thus securing the aircraft to which the hook or line is connected. In some cases, the connector rod 200 provides a connection point to attach a lifting shackle or hook, which in turn is coupled with a cable that is attached with the aircraft. What is more, the connector rod 200 can be attached to a which holds the tie-down assembly in place during installation, as discussed elsewhere herein.

The tie-down assembly 100 also includes a first talon 210 and a second talon 220. (hidden, shown in dashed lines) The first and second talons 210, 220 are in operative association with a talon pivot rod 230. As shown here, a first stop ring 240 can be coupled with the talon pivot rod 230, so as to prevent the first talon 210 from sliding off the talon pivot rod 230. The first talon 210 can rotate or pivot about the talon pivot rod 230, so as to move from an undeployed configuration (as shown here) to a deployed configuration (as shown elsewhere herein), for example in which the first talon 210 contacts a first talon stop rod 260. The second talon 220 can rotate or pivot about the talon pivot rod 230, so as to move from an undeployed configuration (as shown here) to a deployed configuration (as shown elsewhere herein), for example in which the second talon 220 contacts a second talon stop rod 270.

Figure 4A:
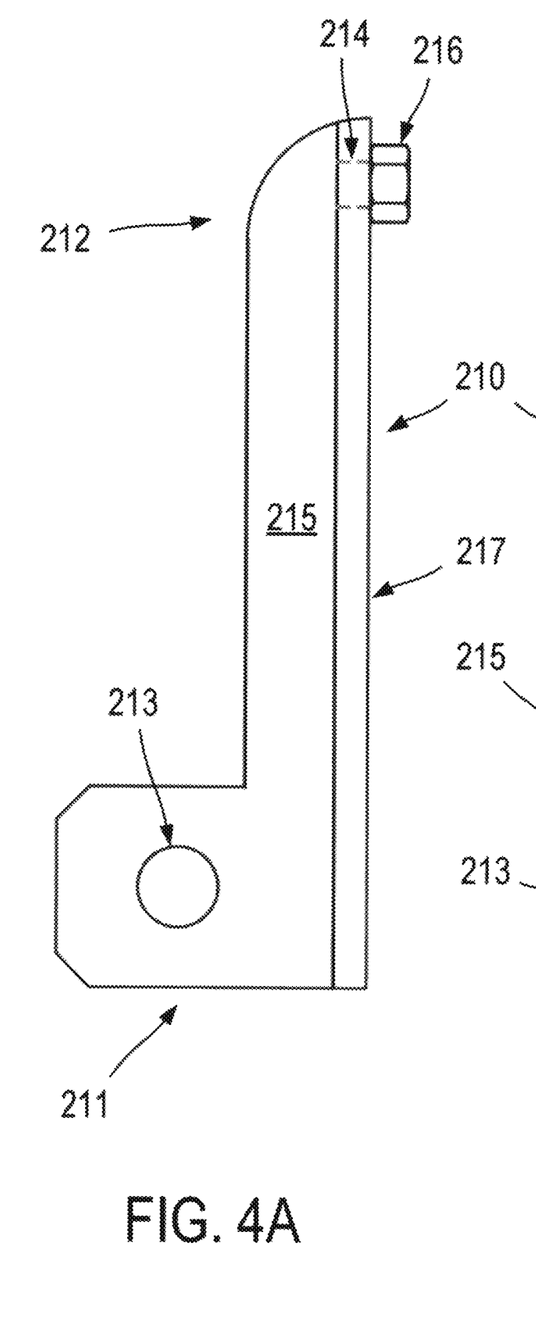
FIGS. 4A and 4B illustrate aspects of a deployable talon according to certain embodiments of the invention.

FIG. 4A depicts aside view of a first talon 210, according to embodiments of the present invention. A second talon may include similar features. As show here, first talon 210 includes a proximal portion 211 and a distal portion 212. The first talon 210 also includes a side plate 215 and an end plate 217. The proximal portion 211 includes a proximal aperture 213, which is configured to receive or to otherwise be in operative association with a talon pivot rod (not shown). The proximal aperture 213 extends through the side plate 15. The distal portion 212 includes a distal aperture 214, which is configured to receive or to otherwise be in operative association with an adjustment bolt (not shown). The distal aperture extends through the end plate 217. The distal portion 212 also includes or is coupled with a hex nut 216 (e.g. a threaded hex nut), which is configured to receive or to otherwise be in operative association with an adjustment bolt (not shown). In some cases, instead of using a hex nut, the distal aperture 214 can be tapped to match the threading of a tap bolt.

Figure 4B:
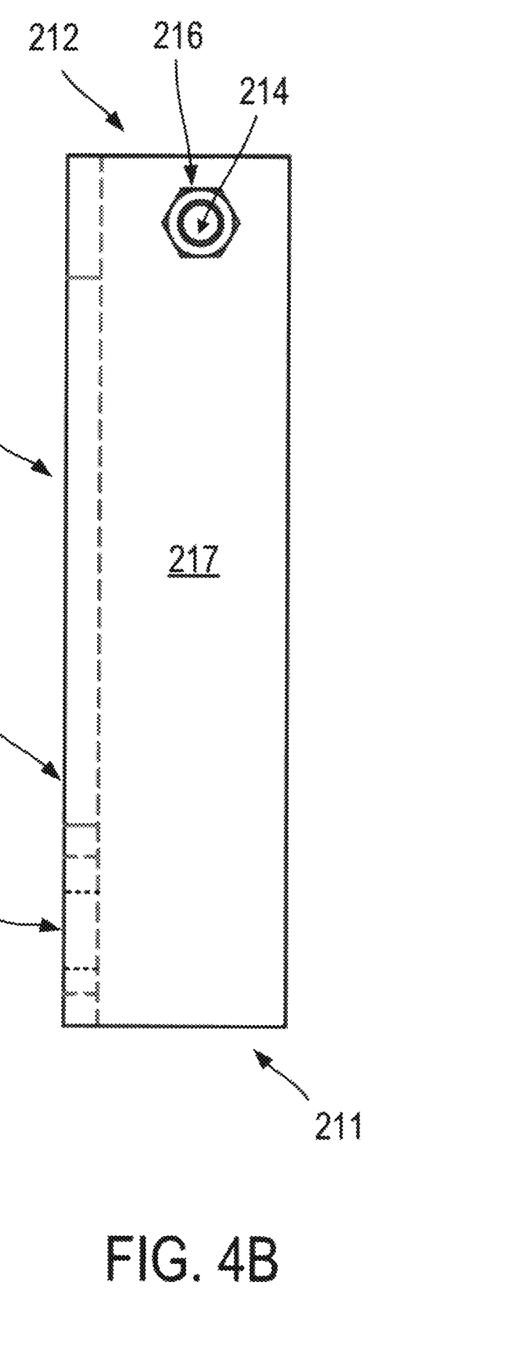

FIG. 4B depicts an end view of a first talon 210, according to embodiments of the present invention. A second talon may include similar features. As show here, first talon 210 includes a proximal portion 211 and a distal portion 212. The proximal portion 211 includes a proximal aperture 213, which is configured to receive or to otherwise be in operative association with a talon pivot rod (not shown). The distal portion 212 includes a distal aperture 214, which is configured to receive or to otherwise be in operative association with an adjustment bolt (not shown). The distal portion 212 also includes or is coupled with a hex nut 216, which is configured to receive or to otherwise be in operative association with an adjustment bolt (not shown). In some cases, instead of using a hex nut, the distal aperture 214 can be tapped to match the threading of a tap bolt.

Tie-Down Installation

Figure 5:
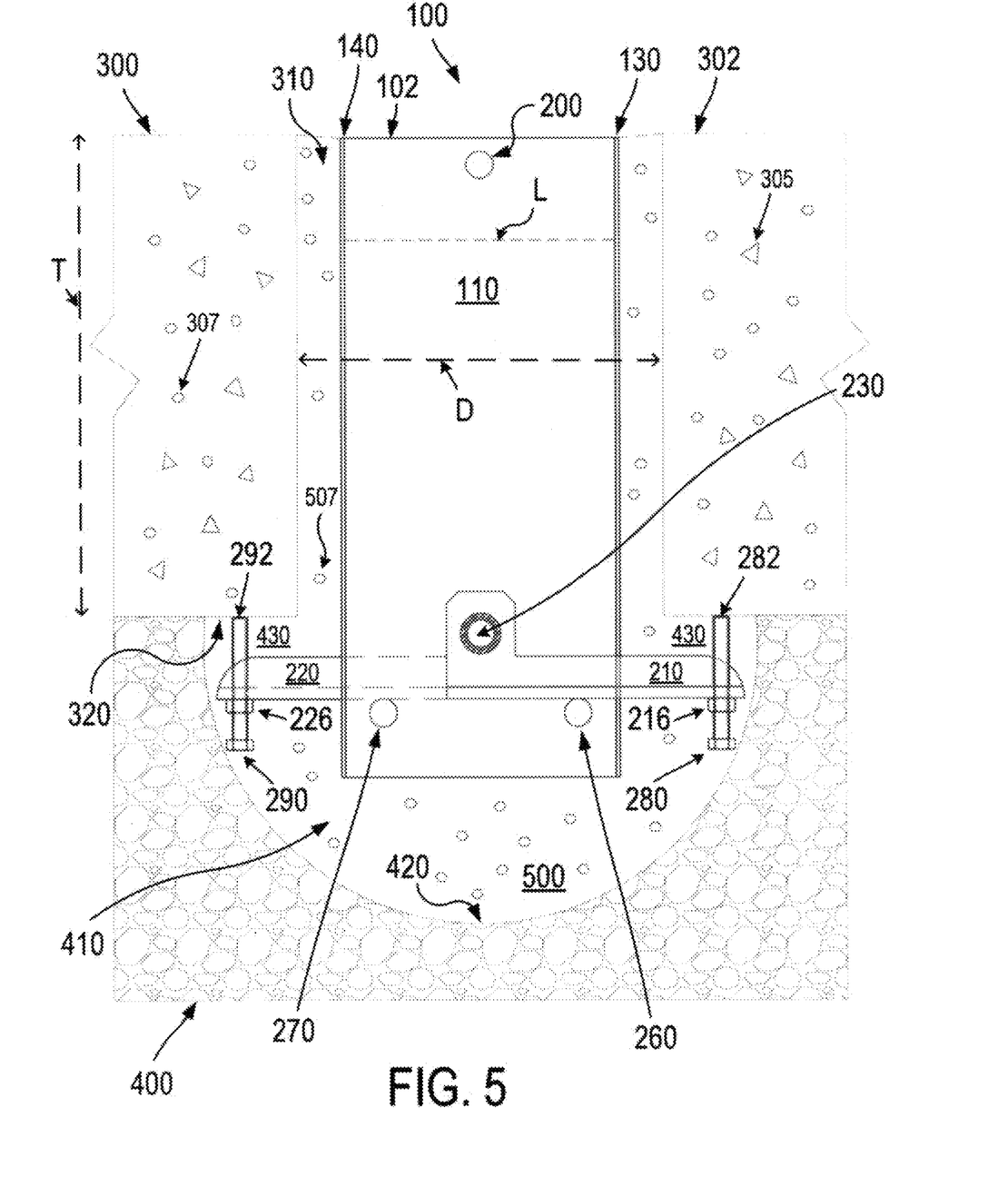
FIG. 5 illustrates aspects of a tie-down assembly according to certain embodiments of the invention.

FIG. 5 provides a cross-section side view depicting aspects of a tie-down assembly 100 which has been installed, for example in a concrete slab 300 of an aircraft parking or mooring area. As shown here, the concrete slab 300 has a thickness T, and a core hole 310 having a diameter D has been drilled or otherwise formed in the concrete slab 300. In some cases, the operator of an airfield may have documentation on record which indicates the thickness of the slab 300. In some cases, there may be no such documentation. In some cases, the documentation may be inaccurate or incomplete. In some case, there may be natural or unnatural variation in the thickness of the slab 300. In some cases, such variation may be documented. In some cases, such variation may not be recorded. The tie-down assembly embodiments 100 are well suited for use with slabs having a variety of thicknesses, which may be due to any of a variety of reasons.

In some embodiments, a hollow core bit can be used to drill a core, and the core can be removed so as to leave the core hole 310. In some cases, the hollow core bit is a 12-inch diameter core bit, and the core hole 310 has a diameter D of 12 inches. The core hole 310 can extend through the thickness T of the slab 300. In some cases, the slab 300 is a Portland cement concrete (PCC) slab. The tie-down assembly 100 can be installed in any of a variety of concrete or pavement slabs. As shown here, the core hole 310 is in a vertical orientation. can be used for the installation. The slab 300 is supported by a base 400, which may be a granular or stabilized base. In some cases, base 400 includes gravel, soil, crushed limestone, or any other desired material. In some cases, the slab 300 may be created with the core hole 310 already in place (e.g. by pouring wet cement around a cylindrical plug that is later removed after the cement hardens), so that no core drilling is required.

Installation methods can also include augering or otherwise creating abase hole 410 in the base 400. In some cases, the base hole 410 can have a depth between 10 and 12 inches (e.g. as measured vertically from a bottom surface 320 of the slab 300 to a bottom surface 420 of the base hole 410. The base hole 410 can be expanded by undercutting directly beneath the slab 300, so as to provide a lateral base hole space 430 into which the talons can be deployed. To accomplish the undercutting, it is possible to use a chisel, a reamer, or some other tool so as to knock out or dig base material from the sides of base hole after creating the hole by augering.

The aircraft tie-down assembly includes a first side wall 110, and a second side wall (not shown) opposing the first side wall 110. Further, the tie-down assembly 100 includes a first end cover 130, and a second end cover 140 opposing the first end cover. Tie-down assembly 100 also includes a connector rod 200 extending between and coupled with the first side wall 110 and the second side wall. In use, the side walls and/or end coves of the tie-down assembly 100 are configured to permit convenient access to the connector rod 200, so that a mooring hook or tether line may be attached with the connector rod 200, thus securing the aircraft to which the hook or line is connected. In some cases, the connector rod 200 provides a connection point to attach a lifting shackle or hook, which in turn is coupled with a cable that is attached with the aircraft. What is more, the connector rod 200 can be attached to a which holds the tie-down assembly in place during installation, as discussed elsewhere herein. The plane can be anchored to the connector rod 200, so that the plane is secured in place in a stationary manner when the plane is parked.

The tie-down assembly 100 also includes a first talon 210 and a second talon 220. (hidden, shown in dashed lines) The first and second talons 210, 220 are in operative association with a talon pivot rod 230. As shown here, a first stop ring 240 can be coupled with the talon pivot rod 230, so as to prevent the first talon 210 from sliding off the talon pivot rod 230. The first talon 210 can rotate or pivot about the talon pivot rod 230, so as to move from an undeployed configuration (as shown elsewhere herein) to a deployed configuration (as shown here), for example in which the first talon 210 contacts a first talon stop rod 260. The second talon 220 can rotate or pivot about the talon pivot rod 230, so as to move from an undeployed configuration (as shown elsewhere herein) to a deployed configuration (as shown here), for example in which the second talon 220 contacts a second talon stop rod 270. The stop rods 260, 270 may be coupled with the side walls, and can operate to support or hold the talons in a deployed (e.g. horizontal) position or orientation. The talon pivot rod 230 can also be coupled with the side walls, and can operate to allow the talons 210, 220 to rotate relative to the side walls from an undeployed configuration to deployed configuration.

Prior to placing the tie-down assembly 100 into the core hole 310 and base hole 410, the operator or installer can adjust the installation depth of the tie-down assembly. As shown in FIG. 5, the tie-down assembly 100 includes a first depth adjustment mechanism 280, such as a first adjustment or tap bolt in threaded engagement with hex nut 216 of first talon 210, and a second depth adjustment mechanism 290, such as a second adjustment or tap bolt in threaded engagement with hex nut 226 of second talon 220. By adjusting the tap bolts, for example by rotating them in a clockwise or counter-clockwise fashion, it is possible to set the length of the portion of the tap bolts which extend from the top side of the deployed talons as desired, in order to ensure that the top surface or edge 102 of the tie-down assembly 100 is flush, nearly flush, or otherwise at a vertical position relative to the top surface 302 of the slab 300, thereby accommodating the thickness T of the slab 300. As shown in this embodiment, the top surface 102 of the tie-down assembly 100 is slightly below the horizontal plane of the top surface 302 of the slab 300.

Where the thickness T of the slab 300 is relatively large, the tap bolts 280, 290, will not be threaded as far into the hex nuts 216, 226, respectively, and hence the portion of the tap bolts which extend from the top side of the deployed talons will be relatively shorter. In contrast, where the thickness T of the slab 300 is relatively small, the tap bolts 280, 290, will be threaded farther into the hex nuts 216, 226, respectively, and hence the portion of the tap bolts which extend from the top side of the deployed talons will be relatively longer. In this embodiment, the slab thickness T corresponds generally to a length portion of the tie-down assembly 100 that extends from the top 102 of the tie-down assembly 100 to a location on the tie-down assembly that is horizontally aligned with the top of the tap bolt when the talon is deployed. According to some embodiments, the determination of how far to set the tap bolts 280, 290 into the hex nuts 216, 226 can be based on a measured, recorded, or otherwise known or estimated thickness T of the slab 300.

In some cases, the portion of the first tap bolt which extends from the top side of the deployed first talon may have the same length as the portion of the second tap bolt which extends from the top side of the deployed second talon. In some cases, the portion of the first tap bolt which extends from the top side of the deployed first talon may have a longer length than the portion of the second tap bolt which extends from the top side of the deployed second talon (e.g. where the slab thickness is not uniform). In some cases, the portion of the first tap bolt which extends from the top side of the deployed first talon may have a shorter length than the portion of the second tap bolt which extends from the top side of the deployed second talon (e.g. where the slab thickness is not uniform).

As part of the installation process, the tap bolts 280, 290 can be adjusted as desired, the talons 210, 220 can be placed in the undeployed configuration (e.g. as depicted in FIG. 3), the tie-down assembly 100 can be placed in the core hole 310 and base hole 410, and the talons 210, 220 can be deployed. The talons can rotate freely because there is no soil or base to provide resistance, due to the augering and undercutting steps. After the talons are swung out, the installer or operator may ensure that the tie-down assembly 100 is positioned as desired. For example, the installer or operator may ensure that the tie-down assembly 100 is centered in the core hole 310, and the distal tips 282, 292 of the tap bolts 280, 290 can be brought into contact flush against the bottom surface 320 of the slab 300.

To brace the distal tips 282, 292 against the bottom surface 320 of the slab 300, the installer or operator may apply an upward or lifting force to the tie-down assembly. For example, the tie wires can be attached to one or more connection points (e.g. connector rod 200) and a lifting force can be applied to the tie wires. In this way, it may not be necessary to place supports beneath the tie-down assembly 100 during the installation process so as to hold the tie-down assembly 100 at a desired horizontal position. With reference to FIG. 2, a connector rod 200 may provide a first connection point 202 and a second connection point 204. With returning reference to FIG. 5, in some cases, the top of the tie-down assembly 100 (e.g. top edge 102) can be positioned to be about ⅛ inch below the top surface 302 of the slab 300. The tie wires can hold the tie-down assembly 100 in place, the top of the tie-down assembly 100 between the side walls and end covers can be sealed with tape or a similar material. A setting agent 500 (e.g. concrete or grout) can be poured into the base hole 410. In some cases, the setting agent is a rapid setting grout. The tape can operate to keep the area around the connector rod 200 free of the setting agent 500. As shown here, the slab 300 contains coarse particles 305 and fine particles 307, and the setting agent 500 includes fine particles 507. When the setting agent 500 hardens, the tie-down assembly 100 is secured in place relative to the slab 300. The tie wires can be removed from the connection points, and the tape can be removed from the top of the tie-down assembly. As a further step, if desired, additional setting agent (e.g. concrete or grout) can be poured into the interior of the tie-down assembly 100, for example between the side walls and end covers, to a level L that is about 2 inches below the connector rod 200.

Installation Process

Figure 6:
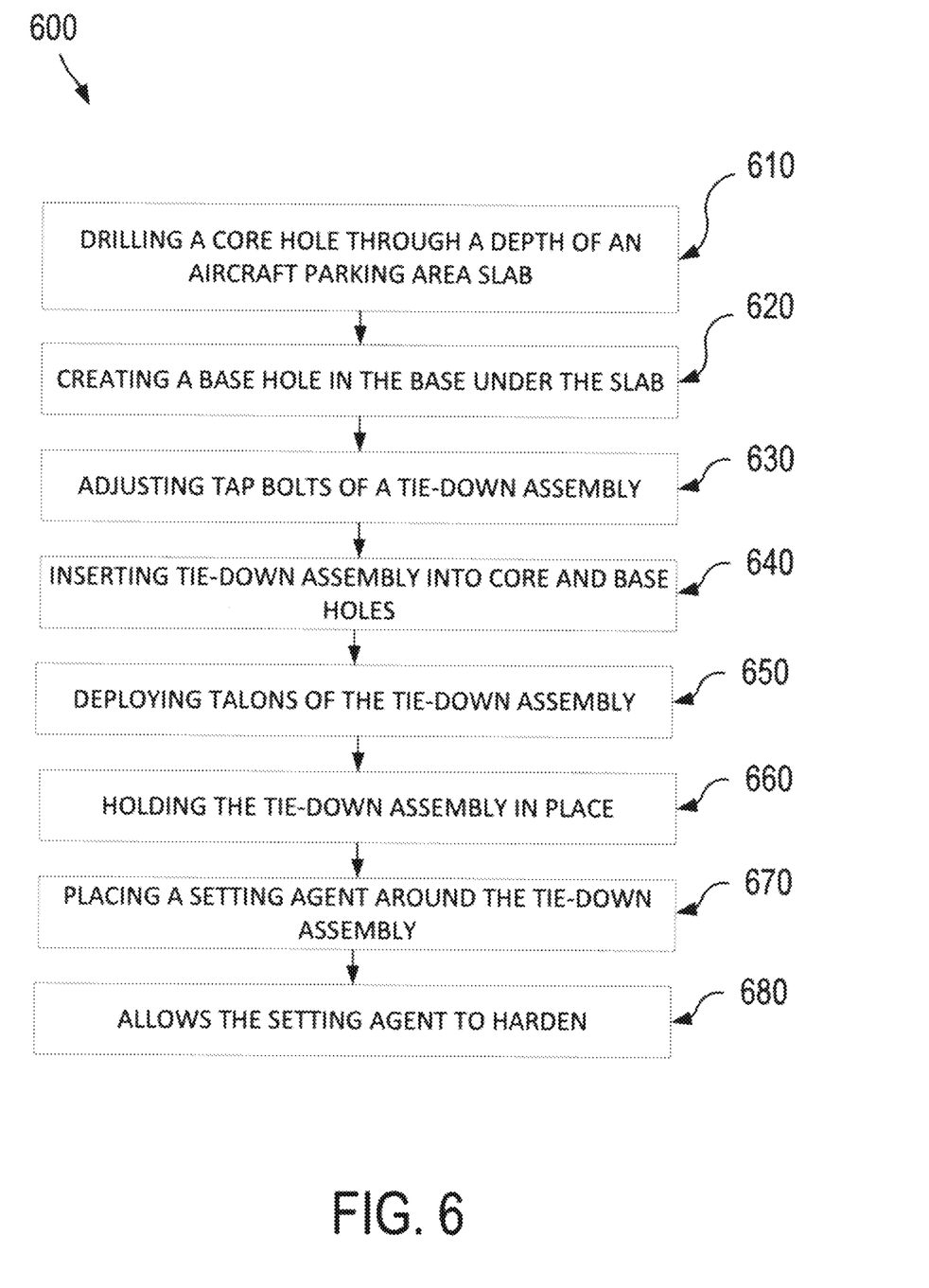
FIG. 6 illustrates aspects of a tie-down assembly installation process according to certain embodiments of the invention.

FIG. 6 illustrates aspects of an installation process 600 according to embodiments of the present invention. As shown here, process 600 includes drilling a core hole through a depth of an aircraft parking or mooring area slab, as depicted by step 610, and creating a base hole in the base beneath the slab, as depicted by step 620. The process 600 also includes adjusting tap bolts of a tie-down assembly based on the slab thickness, as depicted by step 630, inserting the tie-down assembly in the core hole and base hole, as depicted by step 640, and deploying talons of the tie-down assembly, as depicted by step 650. Further, the process 600 may include holding the tie-down assembly in place, as depicted by step 660, placing a setting agent around the tie-down assembly, as depicted by step 670, and allows the setting agent to harden, as depicted by step 680.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A tie-down assembly for securing a parked aircraft to a surface of an aircraft mooring area, the tie-assembly comprising:

a support structure;
   a connector rod coupled with the support structure;
   a first talon rotatably coupled with the support structure;
   a second talon rotatably coupled with the support structure;
   a first depth adjustment mechanism coupled with the first talon; and
   a second depth adjustment mechanism coupled with the second talon.

2. The assembly of claim 1, wherein the support structure comprises a first side wall, a second side wall, a first end cover coupled with the first side wall and the second side wall, and a second end cover coupled with the first side wall and the second side wall.

3. The assembly of claim 1, further comprising a talon pivot rod coupled with the support structure, wherein the first talon and the second talon are coupled with the talon pivot rod.

4. The assembly of claim 3, further comprising a first talon stop ring that secures the first talon in place on the talon pivot rod, and a second talon stop ring that secures the second talon in place on the talon pivot rod.

5. The assembly of claim 1, further comprising a first talon stop rod coupled with the support structure and a second talon stop rod coupled with the support structure.

6. The assembly of claim 1, wherein the first depth adjustment mechanism comprises a first threaded tap bolt and the second depth adjustment mechanism comprises a second threaded tap bolt.

7. The assembly of claim 6, further comprising a first threaded hex nut coupled with the first talon and a second threaded hex nut coupled with the second talon, wherein the first threaded tap bolt is in threaded cooperation with the first threaded hex nut and the second threaded tap bolt is in threaded cooperation with the second threaded hex nut.

8. The assembly of claim 6, wherein the first talon comprises a first aperture that is tapped to match the threading of the first threaded tap bolt and the second talon comprises a second aperture that is tapped to match the threading of the second threaded tap bolt.

9. A method of installing a tie-down assembly in a slab of an aircraft parking area, the method comprising:

drilling a core hole through the slab of the aircraft parking area;
   creating a base hole beneath the slab;
   adjusting a first depth adjustment mechanism and a second depth adjustment mechanism of the tie-down assembly;
   inserting the tie-down assembly into the core hole and the base hole;
   deploying a first talon and a second talon of the tie-down assembly;
   holding the tie-down assembly in place; and
   securing the tie-down assembly in place relative to the slab.

10. The method of claim 9, wherein the step of securing the tie-down assembly in place relative to the slab comprises placing a setting agent in the core hole and base hole and in contact with the tie-down assembly.

11. The method of claim 10, wherein the setting agent comprises a member selected from the group consisting of a concrete and a grout.

12. The method of claim 9, wherein the step of holding the tie-down assembly in place comprises applying a lifting force to the tie-down assembly, so as to bring the first depth adjustment mechanism and the second depth adjustment mechanism against a bottom surface of the slab.

13. The method of claim 9, wherein the tie-down assembly comprises a support structure, wherein the first talon and the second talon are rotatably coupled with the support structure, wherein the first depth adjustment mechanism is coupled with the first talon, and wherein the second depth adjustment mechanism is coupled with the second talon.

14. The method of claim 13, wherein the support structure comprises a first side wall, a second side wall, a first end cover coupled with the first side wall and the second side wall, and a second end cover coupled with the first side wall and the second side wall.

15. The method of claim 9, wherein the tie-down assembly comprises a support structure and a talon pivot rod coupled with the support structure, and wherein the first talon and the second talon are coupled with the talon pivot rod.

16. The method of claim 15, wherein the tie-down assembly further comprises a first talon stop ring that secures the first talon in place on the talon pivot rod, and a second talon stop ring that secures the second talon in place on the talon pivot rod.

17. The method of claim 16, wherein the tie-down assembly further comprises a first talon stop rod coupled with the support structure and a second talon stop rod coupled with the support structure.

18. The method of claim 9, wherein the first depth adjustment mechanism comprises a first threaded tap bolt and the second depth adjustment mechanism comprises a second threaded tap bolt, wherein the tie-down assembly further comprises a first threaded hex nut coupled with the first talon and a second threaded hex nut coupled with the second talon, and wherein the first threaded tap bolt is in threaded cooperation with the first threaded hex nut and the second threaded tap bolt is in threaded cooperation with the second threaded hex nut.

19. The method of claim 9, wherein the first depth adjustment mechanism comprises a first threaded tap bolt and the second depth adjustment mechanism comprises a second threaded tap bolt, and wherein the first talon comprises a first aperture that is tapped to match the threading of the first threaded tap bolt and the second talon comprises a second aperture that is tapped to match the threading of the second threaded tap bolt.

20. A tie-down assembly for securing a parked aircraft to a surface of an aircraft mooring area, the tie-assembly comprising:
    a support structure having a first side wall, a second side wall, a first end cover coupled with the first side wall and the second side wall, and a second end cover coupled with the first side wall and the second side wall;
    a connector rod coupled with the first side wall and the second side wall;
    a talon pivot rod coupled with the first side wall and the second side wall;
    a first talon rotatably coupled with the talon pivot rod;
    a second talon rotatably coupled with the talon pivot rod;
    a first depth adjustment mechanism coupled with the first talon; and
    a second depth adjustment mechanism coupled with the second talon.

\* \* \* \* \*